UNITED STATES PATENT OFFICE.

OTTO FISCHER, OF MUNICH, BAVARIA, GERMANY.

PROCESS OF PREPARING LEUCO-BASE OF ANILINE-BLUE.

SPECIFICATION forming part of Letters Patent No. 248,153, dated October 11, 1881.

Application filed March 24, 1881. (Specimens.)

*To all whom it may concern:*

Be it known that I, Dr. OTTO FISCHER, a subject of the King of Bavaria, and a resident of Munich, in the Empire of Germany, have invented an Improved Process of Manufacturing the Leuco-Base of Aniline-Blue, of which the following is a specification.

My invention consists in the production of the leuco-base of aniline-blue by the reaction of the para-amidobenzaldehyde on a mixture of diphenylamine and methyl-diphenylamine in various proportions. This leuco-base, as is well known to chemists, can be converted into aniline-blue by oxidizing agents. The para-amido-benzaldehyde is produced by reducing the para-nitrobenzaldehyde by means of tin dichloride and muriatic acid in aqueous solution, or also by means of tin, iron, or zinc in alcohol solution containing muriatic or acetic acid.

In the following example I explain the production and subsequent treatment of the para-amidobenzaldehyde, the method of producing the latter being similar to that described in an application filed by me March 19, 1881, serial No. 28,695. I dissolve ten parts of para-nitrobenzaldehyde in fifty parts of alcohol, and I add fifty parts of muriatic acid. To this solution I gradually add twelve parts of zinc powder, and I heat this until the zinc is dissolved. Afterward the alcohol is distilled off and the yield thickened on a water bath. The product thus obtained is heated to 120° to 140° centigrade (248° to 284° Fahrenheit) with thirty-three parts of a mixture of diphenyla-mine and methyl-dephinylamine and ten parts of solid zinc chloride. From the smelt thus obtained I separate the leuco-base in a manner well known to chemists, and oxidize the same to aniline-blue by well-known oxidizing agents, such as manganese dioxide and lead dioxide or chloranil.

I am aware of the work which has already been done by Girard and Delaire and Hoffman in regard to diphenylamines and their compounds, and therefore do not desire to claim their processes; but

I claim as my invention—

1. The mode herein described of producing the leuco base of aniline-blue by the reaction of para-amidobenzaldehyde on mixtures of diphenylamine and methyl-diphenylamine, substantially as set forth.

2. The mode herein described of producing the leuco-base of aniline-blue—that is, by first dissolving para-nitrobenzaldehyde in alcohol and muriatic acid, then dissolving zinc powder in this solution and distilling off the alcohol, then mixing the product with diphenyla-mine and methyl-diphenylamine and zinc chloride, and finally separating the leuco-base from the compound, all substantially in the manner and proportions set forth.

In testimony whereof I have signed my name to this specification in the presence of two subscribing witnesses.

OTTO FISCHER.

Witnesses:
 A. SPIEGEL,
 K. BUCHKA.